United States Patent
Bardts

(10) Patent No.: US 12,163,042 B2
(45) Date of Patent: Dec. 10, 2024

(54) HIGH CHEMICAL RESISTANT COATING AS PROTECTION AGAINST AGGRESSIVE ENVIRONMENT

(71) Applicant: 3M INNOVATIVE PROPERTIES COMPANY, St. Paul, MN (US)

(72) Inventor: Mareike Bardts, Hilden (DE)

(73) Assignee: 3M Innovative Properties Company, St. Paul, MN (US)

( * ) Notice: Subject to any disclaimer, the term of this patent is extended or adjusted under 35 U.S.C. 154(b) by 757 days.

(21) Appl. No.: 17/295,905

(22) PCT Filed: Dec. 10, 2019

(86) PCT No.: PCT/IB2019/060622
§ 371 (c)(1),
(2) Date: May 21, 2021

(87) PCT Pub. No.: WO2020/121197
PCT Pub. Date: Jun. 18, 2020

(65) Prior Publication Data
US 2021/0395562 A1  Dec. 23, 2021

(30) Foreign Application Priority Data
Dec. 12, 2018  (EP) .................... 18212024

(51) Int. Cl.
| | | |
|---|---|---|
| *C09D 163/00* | (2006.01) | |
| *B05D 3/02* | (2006.01) | |
| *C08G 59/24* | (2006.01) | |
| *C08G 59/38* | (2006.01) | |
| *C08G 59/50* | (2006.01) | |
| *C08K 3/22* | (2006.01) | |
| *C09D 5/08* | (2006.01) | |
| *C09D 7/61* | (2018.01) | |
| *C09D 163/02* | (2006.01) | |
| *C09D 163/04* | (2006.01) | |
| *B32B 15/092* | (2006.01) | |
| *B32B 27/38* | (2006.01) | |
| *C08K 3/32* | (2006.01) | |

(52) U.S. Cl.
CPC .......... *C09D 163/00* (2013.01); *C08G 59/245* (2013.01); *C08G 59/5006* (2013.01); *C08G 59/5026* (2013.01); *C08K 3/22* (2013.01); *C09D 7/61* (2018.01); *C08K 2003/325* (2013.01)

(58) Field of Classification Search
None
See application file for complete search history.

(56) References Cited

FOREIGN PATENT DOCUMENTS

| | | | |
|---|---|---|---|
| CA | 2751849 | 6/2017 | |
| CN | 101560358 A | 10/2009 | |
| CN | 104449244 | 10/2016 | |
| CN | 107778456 | 3/2018 | |
| DE | 102017217070 | 9/2018 | |
| JP | 2017141401 A * | 8/2017 | ........... C09D 163/02 |
| KR | 10-1474836 | 12/2014 | |
| WO | WO 2014/210298 | 12/2014 | |
| WO | WO 2018/022490 | 2/2018 | |

OTHER PUBLICATIONS

Machine translation of JP-2017141401-A (no date).*
1507 Extended EP Search Report for EP18212024.6, Date Jul. 2, 2019, 2 pgs.
International Search Report for PCT International Application No. PCT/IB2019/060622, mailed on Feb. 10, 2020, 5 pages.

* cited by examiner

*Primary Examiner* — Michael J Feely
(74) *Attorney, Agent, or Firm* — Carlos M. Téllez Rodríguez; 3M Innovative Properties Co

(57) ABSTRACT

A curable coating composition precursor comprising a first part (A) and a second part (B). The first part (A) comprises at least one first epoxy curing agent selected from aliphatic and cycloaliphatic amines and any combinations and mixtures thereof. The second part (B) comprises at least epoxy compound selected from bisphenol A and bisphenol F diglycidylether resins, and any combinations and mixtures thereof; at least one polyfunctional epoxy resin; at least one novolac epoxy resin; and optionally, at least one reactive diluent, Part (A) and/or part (B) comprise at least one inorganic phosphate compound.

17 Claims, No Drawings

HIGH CHEMICAL RESISTANT COATING AS PROTECTION AGAINST AGGRESSIVE ENVIRONMENT

CROSS REFERENCE TO RELATED APPLICATIONS

This application is a national stage filing under 35 U.S.C. 371 of PCT/IB2019/060622, filed Dec. 10, 2019, which claims the benefit of European Application No. 18212024.6, filed Dec. 12, 2018, the disclosures of which are incorporated by reference in their entireties herein.

FIELD

The present disclosure relates to two-part curable coating compositions, precursors thereof and curable coating compositions obtained therefrom. Further, the present disclosure relates to a method for coating and sealing a substrate. In this regard, the present disclosure relates to a coated and sealed mass point as well as to a use of the coating composition precursors and coating compositions as described herein for coating and sealing parts of aircraft and other vehicles.

BACKGROUND

Sealants are used in a wide variety in the manufacture of vehicles. In general, sealants are chemical compounds and are employed to seal gaps between mechanical parts of vehicles. Depending on the use and the vehicle, certain requirements to the sealants have to be met. In particular, in aerospace industry, sealants are used most often, due to the great pressure differences experienced between the interior of an airplane or parts of an airplane and the outer atmosphere, in particular when flying at higher speeds and an altitude. Thus, not only fuel tanks and pipelines, but also doors, windows, interior and other panels, parts of the wings and so on need to be sealed. The requirements of the aerospace industry to the sealants employed are particularly strict. Not only good sealant properties over a long time are desirable, but also a certain resistance towards chemical influence such as fuel or de-icing fluids or even hydraulic fluids. Apart from that, it is always desirable that sealant compositions may be easily applied in manufacturing processes and need as few as possible application steps or additional steps such as application of heat for curing. Presently, sealants employed in aerospace industry are based on polysulfide chemistry.

Polysulfide-based sealants exhibit a broad range of properties advantageous for the intended use, such as high flexibility and resistance to deicing fluid. Apparently, due to these properties, there is at the present point no alternative for polysulfide-based sealants available for most aerospace applications. However, there are certain disadvantages reported in conjunction with polysulfide-based sealants, such as high shrinkage (which means that several layers of sealant have to be applied), curing strongly dependent on humidity and temperature (meaning a limited manufacturing cycle), complicate handling of mixing ratios, high density, and strong odour. Moreover, it has been reported that sealants based on polysulfides are not resistant to hydraulic fluids used in present-day aircrafts.

A particular point of interest for the skilled person is the protection of the mass points in aircrafts. Mass points in general are for grounding undesired electricity build-up on wings and fuselage. They may consist, for example, of two overlaying metal panels which are tightened with a metal screw. In a common method to protect these mass points from corrosion, a sealant and an additional coating have to be applied. While the sealant is fuel resistant, the coating is resistant to common hydraulic and deicing fluids such as Skydrol. Presently, a polysulfide sealant is applied first, followed by the application of an epoxy top coat. However, both sealant and coating need to be cured. In addition, the top coat needs to be tack-free until the next working steps around the mass points may be carried out or before the whole part may be removed. Typical curing times for common polysulfide sealants are at least 8 h, while typical epoxy top coats have to be mixed from 2 or three different components and take about 4 h to cure until being tack-free.

Without contesting the technical advantages associated with the sealants and coating compositions used in aerospace industries, in particular with regard to the protection of mass points, there exists a need to replace sealant and coating composition by one material which may be applied in one step and provides both sufficient sealing and protection as desired. Thereby, considerably savings with regard to time and material might be achieved, which is very desirable in aerospace industries.

Other advantages of the curable coating compositions and methods of the present disclosure will be apparent from the following description.

SUMMARY

The present disclosure provides a curable coating composition precursor comprising a first part (A) and a second part (B). The first part (A) comprises at least one first epoxy curing agent selected from aliphatic and cycloaliphatic amines and any combinations and mixtures thereof. The second part (B) comprises at least one epoxy compound selected from bisphenol A and bisphenol F diglycidylether resins, and any combinations and mixtures thereof; at least one polyfunctional epoxy resin; at least one novolac epoxy resin; and optionally, at least one reactive diluent. Part (A) and/or part (B) comprise at least one inorganic phosphate compound.

The present disclosure also provides a curable coating composition, obtained from combining and preferably mixing part (A) and part (B) of the curable coating composition precursor as disclosed herein.

Furthermore, the present disclosure provides a coating, obtained from coating a substrate with the curable coating composition as described herein. In this regard, the substrate is preferably a mass point, preferably of an aircraft.

The present disclosure further provides a method for coating and sealing a substrate. The method comprises combining and mixing part (A) and part (B) of the curable coating composition precursor as described herein such as to obtain a curable coating composition, or providing a curable coating composition as described herein; coating a substrate with the curable coating composition; and allowing the curable coating composition to cure.

Furthermore, the present disclosure provides a coated and sealed mass point, obtained by coating a mass point of an aircraft with the coating composition as disclosed herein and curing the coating composition.

The present disclosure also provides a use of the curable coating compositions and its precursors as described herein for coating and sealing parts of aircraft and vehicles such as cars, trucks, trains or ships.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

The terms "solid" and "liquid" refer to ambient conditions (23° C., 1 bar).

Average particle sizes as referred to herein be number averages. In case of particles that are only substantially spherical the particle size is determined by adding the length of the two main (largest orthogonal) axes of the particle and dividing it by two. "Substantially spherical" means one or all main axes (x-, y- or z-axis) may deviate from the required length to form a perfect sphere by up to 50%, preferably up to 25%.

The curable compositions provided herein, preferably, are extrudable pastes. As used above and below, the term "extrudable paste" refers to compositions which may have an initial extrusion rate measured as described in the test section below which is at least 50 g/min. More preferably, the initial extrusion rate is from 50 g/min up to 300 g/min.

Unless explicitly stated otherwise, all embodiments and optional features of the present disclosure can be combined freely.

The first aspect of the present disclosure is a curable coating composition precursor, comprising:
(a) a first part (A) comprising
    i. at least one first epoxy curing agent selected from aliphatic and cycloaliphatic amines and any combinations and mixtures thereof;
(b) second part (B) comprising
    i. at least epoxy compound selected from bisphenol A and bisphenol F diglycidylether resins, and any combinations and mixtures thereof;
    ii. at least one polyfunctional epoxy resin;
    iii. at least one novolac epoxy resin;
    iv. optionally, at least one reactive diluent;
wherein part (A) and/or part (B) comprise at least one inorganic phosphate compound.

It has been surprisingly found that a curable coating composition according to the present disclosure may provide a property profile useful for industry applications such as aerospace industries applications. In particular, the curable coating compositions according to the present invention provide coatings which are tack-free and dust-free after a short period of time, while after curing at ambient conditions, the coatings exhibit high resistance against aggressive media such as saltwater and Skydrol as used in present-day aircrafts.

Epoxy Resins:

Epoxy resins are polymeric organic compounds having one or more oxirane ring polymerizable by a ring opening reaction. The epoxy-functionalities allow the resin to undertake cross-linking reactions. Such materials, broadly called epoxides, can be cycloaliphatic or aromatic, which means they have one or more unit that is cycloaliphatic or aromatic. Useful materials generally have at least two polymerizable epoxy groups per molecule and, more preferably, from two to four polymerizable epoxy groups per molecule. Typically, the epoxy resins may have an average epoxy-functionality of at least 1, greater than one, or of at least 2, or from about 1 to 4.

The epoxy resin is preferably free or essentially free of aromatic amine moieties. The term "essentially free" as used herein means that trace amounts may be present, for example, due to impurities present in the starting materials or as a result of production process. Such trace amounts include less than 10,000 ppm, preferably less than 5,000 ppm, based on the total amount of the composition.

Typically, but not exclusively, the epoxy resins contain repeating units derived from monomers having an epoxy-functionality as described above but epoxy resins can also include, for example, silicone-based polymers that contain epoxy groups or organic polymer particles coated with or modified with epoxy groups or particles coated with, dispersed in, or modified with epoxy-groups-containing polymers.

Mixtures of various epoxy resins may also be used in the compositions of the invention. Epoxy resins may be selected from the group consisting of alkylene oxides, alkenyl oxides, glycidyl esters, glycidyl ethers, epoxy novolacs, copolymers of acrylic acid esters of glycidol and copolymerizable vinyl compounds, polyurethane polyepoxides, and mixtures thereof.

Preferably, the epoxy resins contain moieties of the glycidyl, diglycidyl or polyglycidyl ether type. Such epoxy resins may be obtained, for example, by the reaction of a hydroxyl functionality (for example but not limited to dihydric or polyhydric phenols or aliphatic alcohols including polyols) with an epichlorohydrine-functionality. As referred to herein, dihydric phenols are phenols containing at least two hydroxy groups bonded to the aromatic ring (also referred to as "aromatic" hydroxy groups) of a phenol—or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups. Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

The curable coating composition precursor according to the present invention comprises in part (B) at least one epoxy compound selected from bisphenol A and bisphenol F diglycidylether resins, and any combinations or mixtures thereof. Preferably, the at least one epoxy compound selected from bisphenol A and bisphenol F diglycidylether resins, and any combinations or mixtures thereof is contained in part (B) in an amount of from 8 to 60 wt.-%, preferably from 10 to 50 wt.-%, more preferably from 15 to 40 wt.-%, based on the total weight of part (B).

In addition, the curable coating composition precursor as described herein comprises in part (B) at least one polyfunctional epoxy resin. Preferably, the at least one polyfunctional resin is selected from triglycidyl ethers, tetraglycidyl ethers and pentaglycidyl ether, preferably from triglycidyl ethers. In this regard, glycidyl ethers of trihydric phenols are particularly preferred. Polyfunctional epoxy resins are commercially available, for example, under the trade designation Tactix such as Tactix 742 (i.e. a triphenylolmethane triglycidyl ether). Preferably, the at least one polyfunctional resin is contained in part (B) in an amount of from 1 to 25 wt.-%, preferably from 2 to 20 wt.-%, more preferably from 3 to 15 wt.-%, based on the total weight of part (B).

Furthermore, the curable coating composition precursor according to the present invention comprises in part (B) at least one novolac epoxy resin. The use of novolac epoxy resins in combination with the at least one epoxy compound and the at least one polyfunctional epoxy resin in part (B) as described herein has the advantage of an improved chemical resistance of the coatings obtained from the coating compositions according to the present disclosure. This is particularly true with regard to chemical resistance against saltwater. Epoxy novolacs are the reaction product of an epoxy group-introducing agent, such as for example epichlorohydrin, with a condensation product of a mono- di or polyhydric phenol (which may be alkyl substituted (e.g. cresol) or non-substituted) and an aldehyde, such as for example, formaldehyde. Typical epoxy novolacs are polymers containing glycidyl ether groups and further comprising repeating units derived from bisphenol F or another reaction product of a phenol with an aldehyde. The phenol may be monohydric, dihydric or trihydric and may be non-substituted or alkyl substituted. Novolac epoxy resins are commercially available under the trade designation DEN such as DEN 431. Preferably, the at least one novolac epoxy resin is contained in part (B) in an amount of from 1 to 25 wt.-%, preferably from 2 to 20 wt.-%, more preferably from 3 to 15 wt.-%, based on the total weight of part (B).

Instead of, or in addition to, the aromatic epoxy resins described above also their fully or partially hydrogenated derivatives (i.e. the corresponding cycloaliphatic compounds) may be used.

The epoxy resins may be liquid at room temperature or solid. Liquid epoxy resins are preferred, since they may be better extruded and mixed with the other ingredients. Typically, the epoxy resins may have a viscosity of from about 400 mPa·s at 20° C. to about 40,000 mPa·s at 50° C. Preferably, the resin has a viscosity of at least 8,000 mPa s at 20° C. up to 5,000 mPa s at 50° C.

Examples of commercially available epoxy resins include diglycidylether of bisphenol A (e.g. available under the trade designation EPON 828, EPON 830 or EPON 1001 from Hexion Speciality Chemicals GmbH, Rosbach, Germany, or under the trade designation D.E.R-331 or D.E.R-332 from Dow Chemical Co,); diglycidyl ether of bisphenol F (e.g. EPICLON 830 available from Dainippon Ink and Chemicals, Inc. or D.E.R.-354 from Dow Chemical Co, Schwalbach/Ts., Germany); silicone resins containing diglycidyl epoxy functionalities; flame retardant epoxy resins (e.g. DER 580, a brominated bisphenol type epoxy resin available from Dow Chemical Co.); Other epoxy resins based on bisphenols are commercially available under the trade designations EPIKOTE (Hexion Speciality Chemicals, Rosbach, Germany), or EPILOX (Leuna Epilox GmbH, Leuna, Germany). Epoxy novolacs are available under the trade designation D.E.N. from Dow Chemical Co, Schwalbach/Ts., Germany, such as for example D.E.N 431 (a novolac resin with an average epoxy functionality of 2.8 and a viscosity of from 1100 to 1700 mPa s at 51.7° C.), D.E.N. 425 a novolac resin with an average epoxy functionality of 2.5 and a viscosity of from 9500 to 12500 mPa s at 25° C., D.E.N. 438 a novolac resin with an average epoxy functionality of 3.6 and a viscosity of from 3100 to 4000 mPa s at 51.7° C.

Furthermore, it is preferred that part (B) of the curable coating composition precursors comprise at least one reactive diluent. This may be advantageous for adjusting the viscosity of the curable coating compositions, preferably such that the coating compositions are able to be applied by means of a brush or the like. This is highly advantageous for applications in aerospace industry, where a large amount of mass points need to be sealed and protected against potentially harmful substances. Preferably, the reactive diluent is selected from diglycidyl ethers of resorcinol, cyclohexane dimethanol, neopentyl glycol, the triglycidyl ether of trimethylolpropane and alkyl monoglycidyl ethers comprising an alkyl group having 1 to 20 carbon atoms. Reactive diluents are commercially available, for example, under the trade designation Epodil such as Epodil 757. It is preferred that the at least one reactive diluent is contained in part (B) in an amount of from 1 to 30 wt.-%, preferably from 5 to 25 wt.-%, more preferably from 10 to 20 wt.-%, based on the total weight of part (B).

Furthermore, it is preferred that part (B) further comprises at least one toughener. This may improve impact resistance of the coatings obtained from the curable coating compositions as described herein, in particular at low temperatures. Basically, any toughener known in the art may be used. However, it is preferred that the at least one toughener is selected from core-shell polymers, rubbers such as butadiene-nitrile rubbers, and silicone rubbers, and any combinations and mixtures thereof. Generally, and as common in the art, tougheners are used in the form of particles or powders. Preferably, the toughener particles as described herein are employed as dispersions in epoxy resins. Tougheners such as silicone rubbers, in particular non-functionalized silicone rubbers and core-shell polymers, which are dispersed in epoxy resin, preferably in either or both bisphenol A and bisphenol F epoxy resins, exhibit on one hand a good compatibility with the epoxy resins, but also give rise to a higher flexibility of the sealant obtained therefrom. An example for commercially available silicone rubbers dispersed in epoxy resins is Albidur 2240A (Evonik Industries). Core-shell polymer particles dispersed in epoxy resins are commercially available, for example, as Kane Ace MX257 (Kaneka). Preferably, the curable coating compositions according to the present disclosure contain the at least one toughener in part (B) in an amount of from 1 to 40 wt.-%, preferably from 2 to 30 wt.-%, more preferably from 5 to 25 wt.-%, based on the total weight of part (B).

Epoxy Curing Agents in Part (A):

The curable coating composition precursor according to the present invention comprise in part (A) at least one first epoxy curing agent selected from aliphatic and cycloalphatic amines, and polyetheramines, and any combinations and mixtures thereof. Preferably, the curable coating composition precursor as described herein further comprises in part (A) at least one second epoxy curing agent selected from amine-epoxy adducts and polyamidoamines and any combinations and mixtures thereof. The combination of at least one first and at least one second epoxy curing agent may have the effect of providing fast curing in combination with a good chemical network of the coating obtained, i.e. having high resistance against both physical and in particular chemical external influences.

Preferably, the at least one first epoxy curing agent may have an amine equivalent weight (AEW) of at least 150 grams per mole of amine equivalents. In that context, the epoxy curing agent for use herein may be any aliphatic, cycloaliphatic, linear, branched or aromatic polyether amine provided it meets the (AEW) requirement mentioned above. The same is true if a combination of two epoxy curing agents are employed, i.e. the combination of epoxy curing agents needs to have a total amine equivalent weight of at least 150 grams per mole of amine equivalent. The term "amine equivalent weight" has the meaning as common in the art. As commonly known, the amine equivalent weight may easily be determined by titration. For example, the amine may be titrated with 0.1 N aqueous hydrochloric acid. The amine equivalent weight is the weight of the sample divided by the equivalents of hydrochloric acid used for titration.

Without wishing to be bound by theory, it is believed that the epoxy curing agent having an amine equivalent weight of at least 150 grams per mole of amine equivalents provides fast curing properties to the curable coating compositions due its inherent high reactivity, while further providing excellent chemical resistance after curing with the epoxy resin.

Furthermore, the at least one first epoxy curing agent may comprise at least one aliphatic amine, preferably containing at least one primary amine residue and may be branched, cyclic or acyclic.

The aliphatic amines as described herein may be linear or branched amines of the general structure:

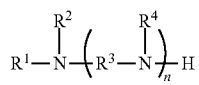

wherein
the residues $R^1$, $R^2$, and $R^4$, independently from each other, may represent hydrogen or a hydrocarbon (such as an alkyl) or an alkoxy or a polyoxyalkyl residue. $R^3$ represents a hydrocarbon, an alkylether or a polyether alkyl residue. More preferably $R^3$ is a polyetheralkyl residue. Preferably, the residues $R^1$, $R^2$, and $R^4$ are chosen such that the amine contains at least one or two primary amine groups;
n represents an integer.

Suitable polyether amines include those that can be derived from polypropylene oxide or polyethylene oxide. For example, one compound suitably used as polyetheramines is trioxatridecandiamine commonly known as TTD and commercially available, e.g., from Brenntag Specialities, Inc. (NJ, USA).

It is preferred that the residues and integers are chosen such that the amines exhibit a melting point of from about 30° C. up to about 100° C., preferably from about 40° C. up to about 90° C., more preferably from about 60° C. to about 80° C. This is particularly advantageous with regard the processability and the shelf-life of the curable compositions as described herein as well as the mechanical properties of the cured void fillers obtained therefrom. The amines as described above are commercially available, for example, within the JEFFAMINE series from Huntsman Chemicals, or within the ANCAMINE series from Airproducts.

Preferably, the curable coating compositions according to the present disclosure comprise in part (A) the at least one first epoxy curing agent in an amount of from 10 to 70 wt.-%, preferably from 15 to 60 wt.-%, more preferably from 20 to 55 wt.-%, based on the total weight of part (A).

With regard to the at least one second epoxy curing agent, it is preferably selected from epoxy adducts of aromatic or aliphatic diamines and polyetheramines, and polyamidoamines, and any combinations and mixtures thereof. For example, an adduct of TTD with a commercially available epoxy resin such as Epon 828 may be advantageously used. Preferably, the adduct has an amine equivalent weight of at least 150 grams per mole of amine equivalents. The adduct of TTD with said epoxy resin may be readily prepared by procedures well-known to the skilled person, e.g. by mixing TTD and epoxy resin and keeping the mixture for about one hour at elevated temperatures such as about 100° C. The polyamidoamine may be branched or unbranched aromatic or branched or unbranched aliphatic. Preferably, the polyamidoamine is a polyether amido-amine, more preferably an aliphatic polyether amido-amine Polyamidoamines such as polyether amidoamines, in particular aliphatic polyether polyamidoamines are particularly preferred in the context of the present disclosure.

Preferably, the curable coating compositions according to the present disclosure comprise in part (A) the at least one second epoxy curing agent in an amount of from 10 to 70 wt.-%, preferably from 15 to 60 wt.-%, more preferably from 20 to 55 wt.-%, based on the total weight of part (A).

It was found that a combination of at least one polyetheramine, preferably polyetherdiamine as at least one first epoxy curing agent and at least one polyamidoamine as at least one second epoxy curing agent is particularly advantageous in the context of the present disclosure. Accordingly, it is preferred that the at least one epoxy curing agent comprises at least one polyetheramine, preferably polyetherdiamine and the at least one second epoxy curing agent comprises at least one polyamidoamine.

It is also preferred that the at least one first epoxy curing agent and the at least one second epoxy curing agent are contained in part (A) in a ratio of from 5:1 to 1:5, preferably from 3:1 to 1:3, more preferably from 2:1 to 1:2.

According to an advantageous aspect of the present disclosure, part (A) of the coating composition precursor as described herein comprises at least one epoxy curative. Epoxy curatives are not epoxy curing agents, i.e. they are not necessarily incorporated into the crosslinked network of the epoxy resins. Rather, they may accelerate the crosslinking reactions and may therefore also be called in the art secondary epoxy curatives, curing aids or curing accelerators. In this regard, it is preferred that part (A) comprises at least one first epoxy curative and at least one second epoxy curative distinct from the first curative. Distinct in this regard means "chemically distinct", i.e. being a different compound. Using such a combination of first and second epoxy curative as described herein has the effect of reducing the curing time of the curable coating composition obtained from combining part (A) and part (B) of the curing composition precursor according to the present disclosure. That is, for many applications, in particular in aerospace industry where during manufacture of an aeroplane or parts of aeroplanes great numbers of coatings and sealants are applied, short curing times are at least desirable, if not required. Moreover, curing takes place in these applications under ambient conditions, i.e. without addition of heat. When using the combination of first and second curative as described herein, curing times of lower than 4 h, lower than 3 h or even lower than 2 h when curing at ambient conditions may be observed for curable coating compositions as described herein. The term "curing time" as used herein may be interchangeably used with the term "tack-free time" used in the art for the period of time in which the coating obtained as described herein remains tacky and is not yet fully serviceable.

It is further preferred that the at least one first epoxy curative as described herein is a metal salt. This may have the effect of an increased curing speed, which is very advantageous in many applications, e.g. in coating and sealing connecting parts in the aerospace or automotive manufacturing industry. Accordingly, curing at ambient temperature, together with good mechanical strength of the bond obtained may be achieved.

Preferably, the metal in the metal salt catalyst is selected from the group consisting of alkali, earth alkali, rare earth metals, aluminium, preferably from alkali and earth alkali, more preferably from alkaline earth, even more preferably from calcium, caesium, strontium, and magnesium. The anion is preferably selected from nitrate, nitrite and organic acid anion, preferably sulfates and triflates, more preferably triflates, of which nitrates and triflates are particularly preferred. Nitrates are strongly preferred. It was found that the combination of the second epoxy curative and the first epoxy curative, in particular the metal salt, gives rise to an increase in curing speed. In this regard, metal salt catalyst selected from the group consisting of calcium nitrate, calcium triflate, aluminium nitrate, magnesium nitrate, lithium nitrate, potassium nitrate, sodium nitrate, and any combinations thereof is preferred. The use of calcium nitrate, magnesium nitrate, calcium triflate, and any combinations thereof is preferred, with particular preference on calcium nitrate. Without wanting to being bound to theory, it is believed that the metal salt thickens the material and therefore influences the viscosity of the part (A) of said coating composition precursor in a positive way. For example, it is highly advantageous and therefore preferred that the second epoxy curative is tris-(dimethylaminomethyl) phenol and the first epoxy curative is calcium nitrate, magnesium nitrate, calcium triflate and any combinations thereof, preferably calcium nitrate.

It is further preferred that the at least one first epoxy curative is contained in part (A) of the coating composition precursor as described herein in an amount in the range of from 1 to 25 wt.-%, preferably in the range of from 2 to 20 wt.-%, more preferably in the range of from 5 to 15 wt.-% based on the total weight of part (A).

Preferably, the at least one second epoxy curative is selected form the group consisting of imidazoles, imidazole-salts, imidazolines or aromatic tertiary amines including those having the structure of formula (1):

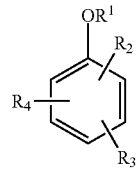

Formula (1)

wherein
$R^1$ is H or alkyl, such as, e.g., methyl or ethyl, preferably methyl;
$R^2$ is $CH_2NR^5R^6$;
$R^3$ and $R^4$ may be, independently from each other, present or absent and when present $R^3$ and $R^4$ are $CH_2NR^5R^6$;
$R^5$ and $R^6$ are, independent from each other, alkyl, preferably $CH_3$ or $CH_2CH_3$.

Exemplary second epoxy curatives for use herein according to formula (3) include tris-2,4,6-(dimethylaminomethyl) phenol commercially available under the trade designation ANCAMINE K54 from Air Products and Chemicals Inc.

Preferably, the at least one second epoxy curative is contained in part (A) of the curable coating composition precursor as described herein in an amount in the range of from 10 to 25 wt.-%, preferably in the range of from 5 to 20 wt.-%, more preferably in the range of from 10 to 15 wt.-%, based on the total weight of part (A).

Inorganic Phosphate Compound:

Part (A) and/or part (B) of the curable coating composition precursors according to the present disclosure comprise at least one inorganic phosphate compound. In combination with the other ingredients of the compositions as described herein, this has the effect that the coatings obtained exhibit a high degree of resistance towards chemical influences, such as water, salt water and deicing and hydraulic liquids commonly used in aerospace such as Skydrol. Preferably, the at least one inorganic phosphate compound is comprised in both part (A) and part (B) of the curable composition precursors as described herein. This is advantageous since the inorganic compound is more evenly distributed in the composition. In addition, distributing the total amount of inorganic phosphate compound in parts (A) and (B) is advantageous since putting the total amount into one part would negatively impact the viscosity of this part of the composition, leading to an also negatively affected mixing properties of the two parts of the coating composition precursors as described herein.

Preferably, the at least one inorganic phosphate compound is selected from orthophosphate, bisphosphate, (hydroxy)-phosphate salts of calcium, magnesium, strontium, sodium, lithium, potassium, aluminium and ammonium, and any combinations and mixtures thereof. A particular preferred combination for the at least one inorganic phosphate compound as described is a mixture comprising calciumhydroxidtrisphosphate and at least one orthophosphate. It was surprisingly found that this combination yields coatings having particular good chemical resistance towards a number of chemical influences commonly found in aerospace.

Preferably, wherein the at least one inorganic phosphate compound is contained in part (A) in an amount of from 1 to 25 wt.-%, preferably from 3 to 20 wt.-%, more preferably from 5 to 15 wt.-%, based on the total weight of part (A). Similarly, it is preferred that the at least one inorganic phosphate compound is contained in part (B) in an amount of from 1 to 30 wt.-%, preferably from 5 to 25 wt.-%, more preferably from 10 to 20 wt.-%, based on the total weight of part (B).

Additives:

It is preferred that part (B) of the curable coating composition precursor as described herein comprise at least one dispersion agent. This may result in better dispersing of the solid ingredients into the liquid matrix and/or prevent sedimentation of the fillers, which is not desirable. As dispersion agents, commonly known compound for this purpose may be used. Preferred dispersion agents comprise at least one polyester. Dispersion agents may be commercially available, for example, from BYK Chemicals under the trade designation, e.g. BYK W9011. Similarly, it is preferred that part (B) of the curable coating compositions as described herein comprise at least one surface additive. The use of surface additives may result in a particular smooth surface of the coatings obtained from the curable compositions according to the present disclosure. Again, any surface additive commonly known in the art may be used, however, it is preferred that the at least one surface additive comprises at least one polysiloxane. Such surface additives may be commercially available, for example, from BYK Chemicals under the trade designation, e.g. BYK 307. Accordingly, it is preferred that the curable coating composition precursors according to the present disclosure comprise in part (B) at least one dispersion agent and/or at least one surface additive, preferably at least one dispersion agent and at least one surface additive.

In this regard, it is preferred that the at least one dispersion agent, preferably comprising at least one polyester, is contained in part (B) of the coating composition precursors as described herein in an amount in the range of from 0.1 to 10 wt.-%, preferably from 0.5 to 8 wt.-%, more preferably from 1 to 5 wt.-%, based on the total weight of part (B). In addition, it is preferred that the at least one surface additive, preferably comprising at least one polysiloxane, is contained in part (B) of the coating composition precursors as described herein in an amount in the range of from 0.01 to 5 wt.-%, preferably from 0.1 to 3 wt.-%, more preferably from 0.3 to 2 wt.-%, based on the total weight of part (B). Using higher amounts of surface additive may have adverse effects to the surface of the obtained coating such as a certain stickiness.

Similarly, it was found that reactive diluents may be advantageous in part (A) of the curable coating composition precursors as described herein. The use of reactive diluents may decrease the viscosity of the coating composition such that application by means of a brush is achieved, which is desirable for many applications and industries. Accordingly, it is preferred that part (A) of the curable coating composition according to the present disclosure comprises at least one reactive diluent. Any reactive diluents known in the art may be used, in particular, the reactive diluents already discussed with regard to part (B) of the curable coating composition precursor may also be used in part (A). However, it was found that reactive diluents not containing epoxy functionalities, but containing amine moieties and, preferably, also silane moieties are particularly advantageous since they confer some additional surface wetting properties, which are also desirable for the coating compositions as described herein. As a preferred example for an amine-reactive reactive diluent carrying silane moieties, 3-Aminopropylethoxysilane may be named, which is commercially available under the trade designation AMEO. Preferably, the at least one reactive diluent is contained in part (A) of the curable coating compositions according to the present disclosure in an amount of from 0.5 to 15 wt.-%, preferably from 1 to 12 wt.-%, more preferably from 2 to 10 wt.-%, based on the total weight of part (A).

With regard to the ratio of part (A) to part (B) of the curable coating composition precursors as described herein, it is preferred that the ratio of part (A) to part (B) is in the range of from 8:1 to 1:8, preferably from 5:1 to 1:5, more preferably from 3:1 to 1:3, even more preferably from 3:1 to 1:2. Particular preferred is a ratio of about 2:1.

The curable coating composition precursor according to the present disclosure may easily be stored, shipped, and applied as desired by the user via an application kit, comprising part (A) and part (B) of said coating composition precursor in separate containers. Thus, the present disclosure further provides an application kit, comprising (a) part (A) of the coating composition precursor according to the present disclosure contained in a first container, (b) part (B) of the coating composition precursor according to the present disclosure contained in a second container, (c) a first portion where at least portions of part (A) and part (B) of said coating composition precursor can be mixed, and a second portion by which the curable coating composition (i.e. combined parts (A) and (B)) are applied onto a surface of a substrate.

"Applying" as used herein has the common meaning as used in the art. "Applying" may comprise application of the curable coating composition by applying by means of nozzle, by extrusion or by simply coating onto a surface, such as by knife coating, or even by application by means of a brush or the like. "Applying" also comprises application onto at least one surface, such as the surface of a part or part of a device, as well as application at least partially into or onto a gap in a part or between a plurality of parts. Accordingly, effective sealing of gaps in a part or between parts may be provided. Similarly, sealing of a surface against outer influences may also be provided. "Parts" include parts such as panels, cases, tanks, screws, fasteners, mass points, bolts and the like, and any combination thereof. In particular, outer or interior parts of vehicles, in particular aircraft, are included herein since the precursors and sealant compositions according to the present disclosure are suited for sealing of gaps and surfaces even under demanding conditions common to aerospace industries.

The present disclosure further provides a curable coating composition, obtained from combining part (A) and part (B) of the curable coating composition precursor as described herein. Part (A) and part (B) of the curable coating composition precursor may be contained in, for example, in separate cartouches of a kit as discussed above, and may then be extruded by a mixing nozzle, yielding a curable coating composition which is then ready to be applied onto a substrate. Preferably, the curable coating composition has a working life of at least 20 minutes, preferably of at least 30 minutes, more preferably of at least 40 minutes. "Working life" has the common meaning in the art and describes the amount of time of a coating composition remains low enough in viscosity that it can still be easily applied to a part or a substrate in a particular application. Working life as described herein is particularly advantageous for handling the curable coating compositions in many applications in industry, such as in sealing of surfaces and mass points of aircraft during maintenance or assembly.

Accordingly, the present disclosure provides a coating, obtained from the curable coating composition as described herein. Preferably, the coating is obtained from applying the curable coating composition as described herein onto a part or a substrate, and allowing the composition to cure, thereby obtaining a coating. In general, curing takes place at ambient conditions and does not require additional heating. This is a particular advantage for the majority of intended and possible applications of the compositions described herein. In many applications, the coating as described herein also provides, due to its properties, a function as a sealant. Hence, the present disclosure also provides a sealant, obtained from the curable coating compositions as described herein. The circumstance that the curable coating compositions as described herein provide a coating which also may act as a sealant is a particular advantage in aerospace industries. For example, a common practice in aerospace industry for sealing mass points of aircrafts comprises applying a polysulfide sealant, which is then coated with an epoxy top coat in order to provide protection against corrosive liquids such as Skydrol. With the curable coating compositions according to the present disclosure being able to provide sufficient sealing and protection, a lot of material and process time may be saved compared to the above-described process according to the state of the art. The coating according to the present disclosure is also preferably tackfree after being coated after 4 hours and less, preferably after 3 hours and less, and more preferably after less than 2 hours. Similarly, it is preferred that the coating as described herein is dust free after being coated after less than 7 hours, preferably after less than 6 hours, more preferably after less than 5 hours. In this regard, "tack free" and "dust free" have the meanings commonly used in the art. That is, "dust free" refers to the drying stage of a coating or varnish film at which airborne particles will not adhere to the coating or varnish. The dust-free time may be determined by tapping gently with the pointer finger on the coating and noting the time when the coating does not adhere to the finger. A stopwatch may be used to count the time after applying the coating. The tack-free time refers to measure a surface cure time during the application of a coating or a sealant and it is usually referred to as the time at which the coating is deemed to be properly adhered and capable of providing maximum protection to a surface without being disrupted or damaged. An advantageous and preferred property of the coatings according to the present disclosure is that the coatings are resistant to skydrol after curing.

The present disclosure further provides a method for coating and sealing a substrate, comprising
(i) Combining and mixing part (A) and part (B) of the curable coating composition precursor as described herein such as to obtain a curable coating composition, or providing a curable coating composition as described herein;
(ii) Coating a substrate with the curable coating composition as described herein;
(iii) Allowing the curable coating composition as described herein to cure.

Preferably, the substrate comprises metal such as steel, titanium, magnesium or aluminium, wood, composite material, or plastic, and any combination thereof. In this regard, it is preferred that the substrate comprises part of a vehicle, such as a part of an aircraft having at least temporary contact with at least one substance selected from deicing fluid, fuel such as avgas or jet fuel, fire-resistant aviation hydraulic fluid, such as Skydrol, water or sodium chloride solution. In this regard, it is preferred that the parts in direct contact with the at least one sealant are made of materials selected from at least one metal, at least one polymeric material and at least one composite material, glass, and composites made therefrom. Preferably, the metal is selected from steel, aluminium, magnesium and titanium and alloys therefrom, the polymeric material is selected from polyurethane, polyimide, polycarbonate, fluorinated polymers such as PTFE and the composite material is a fiber-enforced resin such as a phenolic or epoxy resin. With regard to the vehicle, it is preferably selected from aircraft, helicopter, spacecraft, truck, car, and train. In a preferred embodiment of the present disclosure, the vehicle is an aircraft and the part is a part of a wing, an exterior part of the body or an interior part of the body. In a particular preferred embodiment of the present disclosure, the vehicle is an aircraft such as a plane or helicopter and the coated part comprises at least one mass point. Accordingly, the present disclosure provides a coated and sealed mass point of an aircraft, obtained by coating and sealing a mass point of an aircraft with the coating composition as described herein and allowing the coating composition to cure. As mentioned above, curing takes place at ambient conditions, i.e. without any additional heating, which is particularly advantageous.

Further provided by the present disclosure is a use of the curable coating precursor or of the curable coating composition as described herein for coating and sealing parts in a vehicle, preferably wherein the vehicle is selected from aircraft, helicopter, spacecraft, truck, car, and train. Due to the advantages properties of the coatings as described herein and their resulting suitability for applications in aerospace, it is preferred for the use as described herein that the vehicle is an aircraft or a helicopter. It is further preferred that the coating or coating composition is in permanent contact with at least one part consisting of metal, polymeric material, glass, or composite material, or any combinations thereof. In particular, the use as described herein comprises at least temporary contact with at least one substance selected from deicing fluid, fuel such as avgas or jet fuel, fire-resistant aviation hydraulic fluid, such as Skydrol, water or sodium chloride solution.

Examples

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Materials Used:

| Raw Materials - Trade Name | Description/Function |
| --- | --- |
| TTD | Trioxatridecandiamine/Amine Curative |
| PAA | Aliphatic AmidoAmine (AEW 250 g/eq)/Curative |
| ANKAMINE K 54 | Tris-2,4,6-dimethylaminomethyl-phenol/Accelerator |
| Calcium Nitrate Tetrahydrate | Accelerator |
| AMEO | 3-Aminopropyltriethoxysilan/reactive diluent and wetting agent |
| EPIKOTE 828 | Epoxy resin based on diglycidylether of bisphenol-A/basic epoxy |
| EPIKOTE 232 | Epoxy resin based on diglycidylether of Bisphenol-F/flexible epoxy |
| KANE ACE MX 154 | Core shell Butadiene rubber/Toughener |
| EPODIL 757 | 1,4-Cyclohexandimethanoldiglycidylether/Reactive diluent |
| TACTIX 742 | Trifunctional epoxy resin/Crosslinking agent |
| DEN 431 | Novolac resin |
| BYK W9011 | Dispersing agent |
| BYK 307 | Silicone-containing surface additive |

-continued

| Raw Materials - Trade Name | Description/Function |
|---|---|
| HEUCOPHOS CMP | Pentacalciumhydroxidtris(orthophosphate)/Calcium magnesium orthophosphate/anticorrosion filler |

Test Methods

1. Tensile Properties ISO 37: Rubber, Vulcanized or Thermoplastic

Determination of Tensile Stress-Strain Properties

The specimen's type 2 were made according to ISO 37 (2005-12) test method and cured in an accelerated cure cycle of 3 hours at 60° C. and 6.5 days at room temperature. The measurement was done with a speed of 500 mm/min at room temperature in standard climate (23° C.±2° C. and 50±10% relative humidity). All specimens were conditioned at least 2 hours to standard climate. The tensile strength, elongation at break and tensile modulus are determined with a Zwick Z 100 tensile tester. At least results from three specimens were averaged.

The tensile properties were determined of the cured coating composition before ('untreated') and after soaking in liquids as indicated in the examples.

2. Soaking

The soaking behavior of a cured specimen in liquids was determined by immersing the specimen type 2 (according to ISO 37) in a liquid over 168 hours and at a temperature as indicated in the examples. The soaking behavior was measured by determining the weight before and after immersion from at least 3 specimens type 2. The percent change of weight was calculated and recorded.

Preparation of Parts A and Parts B

Parts A (A1 and A2) of the coating precursor compositions were prepared by combining the ingredients as listed in table 1 using a highspeed mixer (DAC 150 FVZ Speedmixer, from Hauschild Engineering) with stirring at 3000 rpm. In a first step the liquid components for part A were mixed together for 2 min. Solid parts were added one after the other with mixing for 1 minute at 3000 rpm after each addition. In order to prevent hydrolysis, AMEO was added as last ingredient. The complete mixtures were again stirred for 4 min at 3000 rpm in the highspeed mixer to ensure complete dispersion of all ingredients.

Parts B (B1 to B4) of the coating precursor composition were prepared according to the same procedure as outlined for Parts A, but using the ingredients as listed in table 2.

Preparation of Curable Coating Precursors Comprising Part A and Part B

After all raw materials were added the mixtures were (optionally) degassed and then filled into a corresponding unit of a 200 ml dual pack cartridge obtained from Sulzer Mixpac, AG, Rotkreuz, Switzerland, (i.e. one unit for part (A), the other unit for part (B)). A mixing nozzle, type "F 10-18" (for 200 ml), was fitted to the cartridge. After a dwell time of 12-24 hours, the curable coating composition was extruded from the cartridge by using a pneumatic dispensing gun at a pressure of 4 bar (400 kPa). Ratios of part (A) and part (B) were generally about 2 to about 1. Curing of the curable coating composition was done as specified in the test methods above.

TABLE 1

Composition of parts (A), ratios in wt.-%

| Raw Material | A1 | A2 |
|---|---|---|
| TTD | 33.33 | 36.84 |
| PAA | 33.33 | 36.84 |
| ANKAMINE K54 | 9.52 | 10.52 |
| Calcium Nitrate Tetrahydrate | 7.62 | 8.42 |
| AMEO | 4.76 | 5.26 |
| HEUCOPHOS CMP | 9.52 | / |
| Colorant | 1.91 | 2.11 |

TABLE 2

Composition of parts (B), ratios in wt.-%

| Raw Material | B1 | B2 | B3 | B4 |
|---|---|---|---|---|
| EPIKOTE 828 | 10.21 | 12.06 | 11.0 | 11.64 |
| EPIKOTE 232 | 10.21 | 12.06 | 11.0 | 11.64 |
| KANE ACE MX 154 | 22.47 | 26.54 | 24.20 | 25.61 |
| EPODIL 757 | 16.34 | 19.30 | 17.60 | 18.62 |
| TACTIX 742 | 7.15 | 8.44 | / | 8.15 |
| DEN 431 | 12.25 | 14.47 | 13.19 | / |
| BYK W9011 | 0.82 | 0.97 | 0.88 | 0.93 |
| BYK 307 | 2.04 | 2.41 | 2.20 | 2.33 |
| HEUCOPHOS CMP | 15.32 | / | 16.50 | 17.46 |
| Wetting agent | 1.02 | 1.20 | 1.10 | 1.16 |
| Colorant | 2.16 | 2.55 | 2.33 | 2.47 |

TABLE 3

Composition of examples

| | Ex. 1 | Ex 2 | Comp. Ex. 1 | Comp. Ex. 2 |
|---|---|---|---|---|
| part (A) | A1 | A1 | A2 | A1 |
| part (B) | B4 | B1 | B2 | B3 |
| Ratio A:B | 2:1 | 2:1 | 2:1 | 2:1 |

TABLE 4

Properties of cured coating compositions obtained from Ex. 1

| Ageing condition | Tensile Modulus [MPa] | Tensile Strength [MPa] | Elongation [%] | Soaking [%] |
|---|---|---|---|---|
| untreated | 1200 | 25.2 | 32 | / |
| 3% NaCl solution 60° C. | 190 | 13.1 | 79 | 5.1 |
| Skydrol 60° C. | 1585 | 33.3 | 41 | 3.2 |
| Deicing Liquid 23° C. | 1016 | 24.4 | 54.3 | 3.2 |
| Jet Fuel 60° C. | 1180 | 34.8 | 52 | 0.3 |

The coating composition obtained from Ex. 1 exhibits a desirable combination of properties, especially vs. Skydrol, even under demanding soaking and ageing conditions.

TABLE 5

Properties of cured coating compositions obtained from Ex. 2

| Ageing condition | Tensile Modulus [MPa] | Tensile Strength [MPa] | Elongation [%] | Soaking [%] |
|---|---|---|---|---|
| untreated | 1404 | 31.7 | 30.8 | / |
| 3% NaCl solution 60° C. | 1323 | 44.6 | 18.5 | 0.5 |
| Skydrol 60° C. | 1135 | 36.9 | 38 | 2.3 |
| Deicing Liquid 23° C. | 1270 | 27.5 | 34.6 | 2.5 |
| Jet Fuel 60° C. | 1533 | 37.8 | 35.2 | 0.3 |

The addition of a novolac resin improves the chemical resistance of the coating especially against NaCl. The coating composition obtained from Ex. 2 exhibits a desirable combination of properties, even under demanding soaking and ageing conditions.

TABLE 6

Properties of cured coating compositions obtained from Comp. Ex. 1

| Ageing condition | Tensile Modulus [MPa] | Tensile Strength [MPa] | Elongation [%] | Soaking [%] |
| --- | --- | --- | --- | --- |
| untreated | 1295 | 29 | 18 | / |
| 3% NaCl solution 60° C. | 343 | 10.8 | 37 | 12.7 |
| Skydrol 60° C. | 1190 | 30 | 21.3 | 8.6 |
| Deicing Liquid 23° C. | 1140 | 22.9 | 31.8 | 3.2 |
| Jet Fuel 60° C. | 1355 | 34.7 | 22 | 3.1 |

Without inorganic phosphate compound, there is a significant drop in the tensile modulus and/or chemical resistance, in particular vs. NaCl and Skydrol.

TABLE 7

Properties of cured coating compositions obtained from Comp. Ex. 2

| Ageing condition | Tensile Modulus [MPa] | Tensile Strength [MPa] | Elongation [%] | Soaking [%] |
| --- | --- | --- | --- | --- |
| untreated | 1275 | 24.5 | 31 | / |
| 3% NaCl solution 60° C. | 214 | 18.7 | 73.5 | 4.8 |
| Skydrol 60° C. | 1530 | 30 | 28.8 | 3.8 |
| Deicing Liquid 23° C. | 888 | 22.2 | 60.0 | 3.6 |
| Jet Fuel 60° C. | 1130 | 34.8 | 35.5 | 0.3 |

Without crosslinking agent, there is a considerable drop in tensile modulus after soaking, in particular vs NaCl and deicing liquid.

The invention claimed is:

1. A curable coating composition precursor, comprising:
   (a) a first part (A) comprising
      i. at least one first epoxy curing agent selected from aliphatic amines and cycloaliphatic amines;
   (b) a second part (B) comprising
      i. at least one epoxy compound selected from bisphenol A diglycidylether resins and bisphenol F diglycidylether resins;
      ii. at least one polyfunctional epoxy resin;
      iii. at least one novolac epoxy resin; and
      iv. optionally, at least one reactive diluent;
   wherein the first part (A) and/or the second part (B) further comprises an inorganic phosphate mixture comprising calciumhydroxidtrisphosphate and at least one orthophosphate other than the calciumhydroxidtrisphosphate.

2. The curable coating composition precursor according to claim 1, wherein the first part (A) and the second part (B) further comprise the inorganic phosphate mixture.

3. The curable coating composition precursor according to claim 1, wherein the inorganic phosphate mixture is contained in the first part (A) in an amount of from 1 to 25 wt.-%, based on the total weight of the first part (A).

4. The curable coating composition precursor according to claim 1, wherein the inorganic phosphate mixture is contained in the second part (B) in an amount of from 1 to 30 wt.-%, based on the total weight of the second part (B).

5. The curable coating composition precursor according to claim 1, wherein the second part (B) further comprises at least one dispersion agent and/or at least one surface additive.

6. The curable coating composition precursor according to claim 1, wherein the at least one reactive diluent is present in the second part (B).

7. The curable coating composition precursor according to claim 1, wherein the at least one first epoxy curing agent in the first part (A) is selected from cycloaliphatic diamines, aliphatic diamines, and polyetheramines.

8. The curable coating composition precursor according to claim 1, wherein the first part (A) further comprises at least one second epoxy curing agent.

9. The curable coating composition precursor according to claim 1, wherein the inorganic phosphate mixture is contained in the first part (A) in an amount of from 1 to 25 wt.-%, based on the total weight of the first part (A), and the inorganic phosphate mixture is contained in the second part (B) in an amount of from 1 to 30 wt.-%, based on the total weight of the second part (B).

10. The curable coating composition precursor according to claim 9, wherein the second part (B) further comprises at least one dispersion agent and at least one surface additive, and the at least one reactive diluent is present in the second part (B).

11. The curable coating composition precursor according to claim 1, wherein the at least one first epoxy curing agent in the first part (A) is selected from cycloaliphatic diamines, aliphatic diamines, and polyetheramines, and the first part (A) further comprises at least one second epoxy curing agent selected from epoxy adducts of aromatic diamines, epoxy adducts of aliphatic diamines, epoxy adducts of polyetheramines, and polyamidoamines.

12. A curable coating composition, obtained from combining the first part (A) and the second part (B) of the curable coating composition precursor according to claim 1.

13. A method of coating a part of an aircraft or a vehicle, comprising providing a curable coating composition according to claim 12 on the part of an aircraft or a vehicle.

14. A curable coating composition, obtained from combining the first part (A) and the second part (B) of the curable coating composition precursor according to claim 11.

15. A method for coating and sealing a substrate, comprising
   (i) combining and mixing the first part (A) and the second part (B) of the curable coating composition precursor according to claim 1 such as to obtain a curable coating composition;
   (ii) coating a substrate with the curable coating composition; and
   (iii) allowing the curable coating composition to cure.

16. The method according to claim 15, wherein the substrate comprises at least one of metal, wood, composite material, and plastic.

17. A method of coating a part of an aircraft or a vehicle, comprising providing a curable coating composition precursor according to claim 1 on the part of an aircraft or a vehicle.

* * * * *